No. 771,412. PATENTED OCT. 4, 1904.
H. E. BRETT & A. B. BENTON.
CREMATING FURNACE.
APPLICATION FILED NOV. 7, 1901.
NO MODEL. 6 SHEETS—SHEET 1.

Witnesses
Harry A. Brooks
B. W. Pierce

Inventors
Henry E. Brett
Arthur B. Benton
By James R. Rogers
Attorney

No. 771,412. PATENTED OCT. 4, 1904.
H. E. BRETT & A. B. BENTON.
CREMATING FURNACE.
APPLICATION FILED NOV. 7, 1901.
NO MODEL. 6 SHEETS—SHEET 2.

Witnesses
Harry A. Brooks
B. W. Pince

Inventors
Henry E. Brett
Arthur B. Benton
By
James R. Rogers
Attorney.

No. 771,412. PATENTED OCT. 4, 1904.
H. E. BRETT & A. B. BENTON.
CREMATING FURNACE.
APPLICATION FILED NOV. 7, 1901.
NO MODEL. 6 SHEETS—SHEET 3.

Witnesses
Harry A Brooks
B. W. Pierce

Inventors
Henry E. Brett
Arthur B. Benton
By
James R. Rogers
Attorney

No. 771,412. PATENTED OCT. 4, 1904.
H. E. BRETT & A. B. BENTON.
CREMATING FURNACE.
APPLICATION FILED NOV. 7, 1901.
NO MODEL. 6 SHEETS—SHEET 4.

Witnesses
Harry A. Brooks
B. W. Pierce

Inventors
Henry E. Brett
Arthur B. Benton
By
James R. Rogers
Attorney

No. 771,412. PATENTED OCT. 4, 1904.
H. E. BRETT & A. B. BENTON.
CREMATING FURNACE.
APPLICATION FILED NOV. 7, 1901.
NO MODEL. 6 SHEETS—SHEET 5.

Witnesses
Harry A. Brooks
B. W. Pierce

Inventors
Henry E. Brett
Arthur B. Benton
By
James R. Rogers
Attorney

No. 771,412. Patented October 4, 1904.

UNITED STATES PATENT OFFICE.

HENRY E. BRETT AND ARTHUR B. BENTON, OF LOS ANGELES, CALIFORNIA, ASSIGNORS OF ONE-THIRD TO WILLIAM LE MOYNE WILLS, OF LOS ANGELES, CALIFORNIA.

CREMATING-FURNACE.

SPECIFICATION forming part of Letters Patent No. 771,412, dated October 4, 1904.

Application filed November 7, 1901. Serial No. 81,509. (No model.)

*To all whom it may concern:*

Be it known that we, HENRY E. BRETT and ARTHUR B. BENTON, both citizens of the United States, both residing at Los Angeles, in the county of Los Angeles and State of California, have invented a new and useful Cremating-Furnace, of which the following is a specification.

This invention relates to furnaces, and particularly to cremating-furnaces; and some of the objects of the invention are to provide a construction of this general character which will not be expensive in erection, will be durable in service, and will be easily and cheaply operated.

Another object of the invention is to provide for the disposition of human bodies in an efficient, rapid, and economical manner, completely consuming all of the gases evolved from the body during the process of burning.

It is also an object of this invention to provide for the use of liquid or gaseous fuel, but also by slight modification permit the use of solid fuel.

Furthermore, an object of this invention is to provide for the handling of the bodies of the dead and their ashes after cremation with due respect without subjecting them to indignities or doing violence to the feelings of survivors or spectators.

With these and other objects in view the invention consists, essentially, in the construction, combination, and arrangement of parts, substantially as more fully described in the following specification and illustrated in the accompanying drawings, forming part of this application, in which—

Similar characters of reference designate corresponding parts throughout the several views.

Referring to the drawings, and preferably to Figs. 1 to 6 and 9 to 15 thereof, the reference character 1 designates a wall or partition erected in front of the furnace proper and in which an opening 2 may be constructed for the passage of the body to be cremated, it being understood that a chapel or reception-room desirably adjoins the wall 1, and anchored in the wall 1 around the opening 2 is a frame 3, Figs. 1, 4, 9, and 10, constructed to receive a facing or finishing plate 4, preferably curved or rounded to prevent the formation of corners or edges and to facilitate the introduction of the body into the furnace, as well as to make a finish around the opening through which the furnace-door may be removed upon detaching said plate 4.

Figure 1:
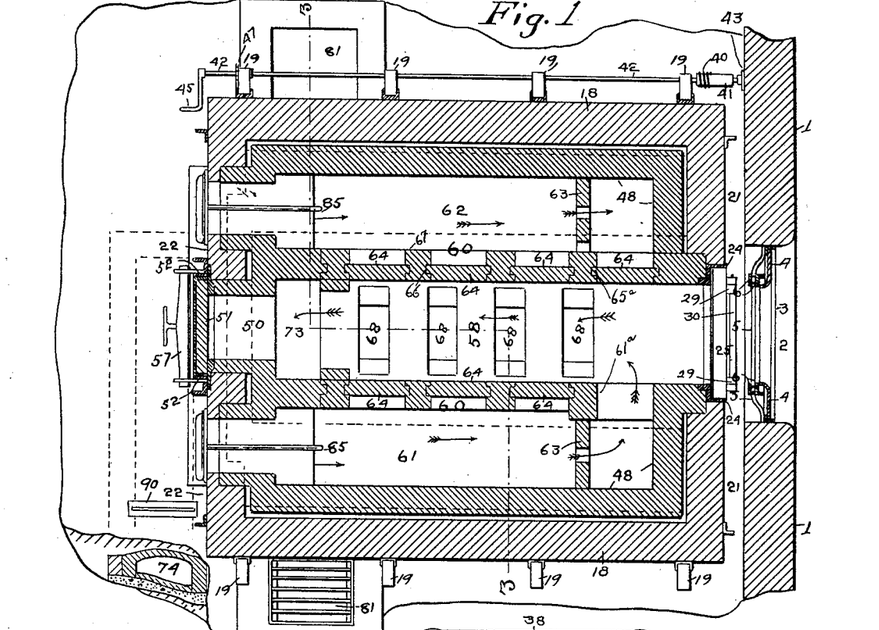
Figure 1 is a horizontal section through the incinerating and fire chambers.
Figures 9, 10, 11, 12, 13, 14, 15:
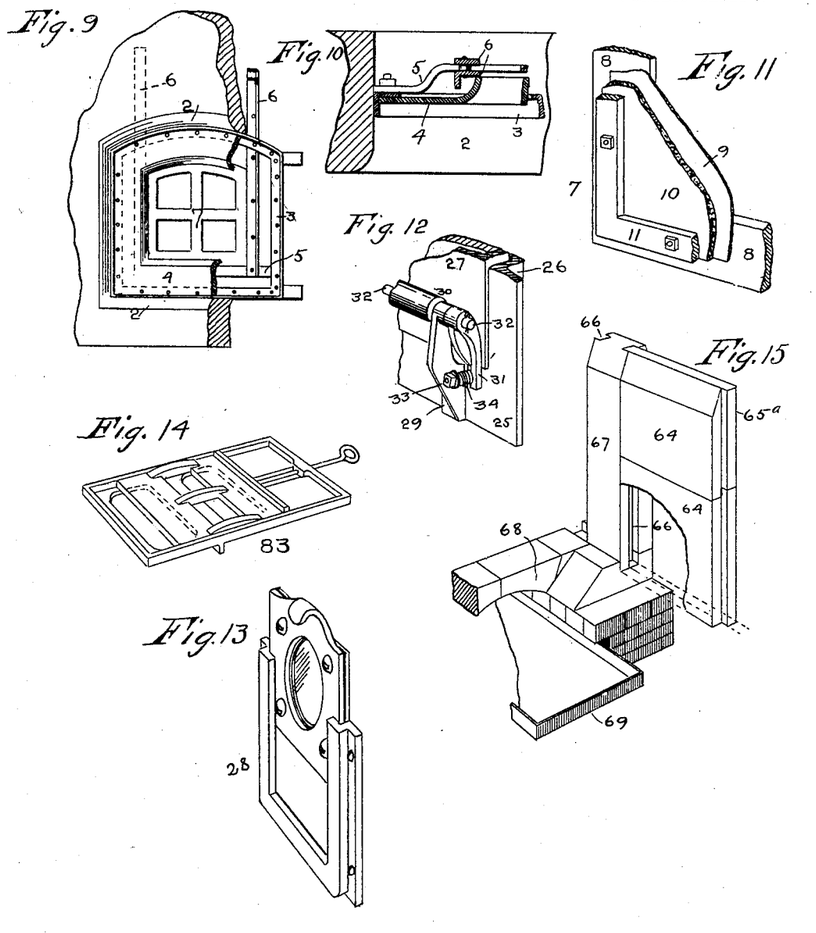
Fig. 9 is a detail view of the mask or outside furnace door.
Fig. 10 is a detail view of a portion of the frame thereof.
Fig. 11 is a detail view of a portion of the outside or mask door.
Fig. 12 is a detail view of a portion of the front door, illustrating the roller and closing-arms.
Fig. 13 is an enlarged detail view of the peep-hole in the furnace-doors.
Fig. 14 is an enlarged detail view of an air-damper employed.
Fig. 15 is an enlarged detail view of the elements employed in the construction.
Figure 16:
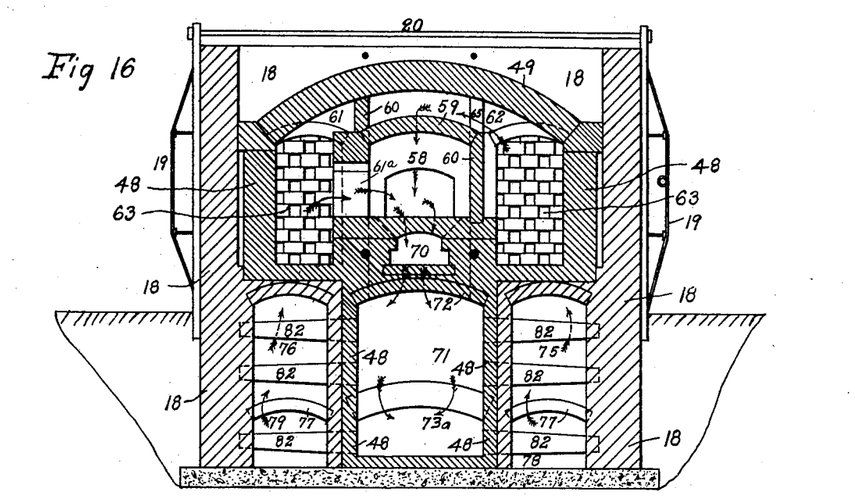
Fig. 16 is a cross-section of the furnace cutting the openings which lead from the fire-chambers 61 and 62 to the incinerating-chamber and to the space above the latter, respectively, looking in the direction of the wall 63 with the ash-pan omitted.
Figure 17:
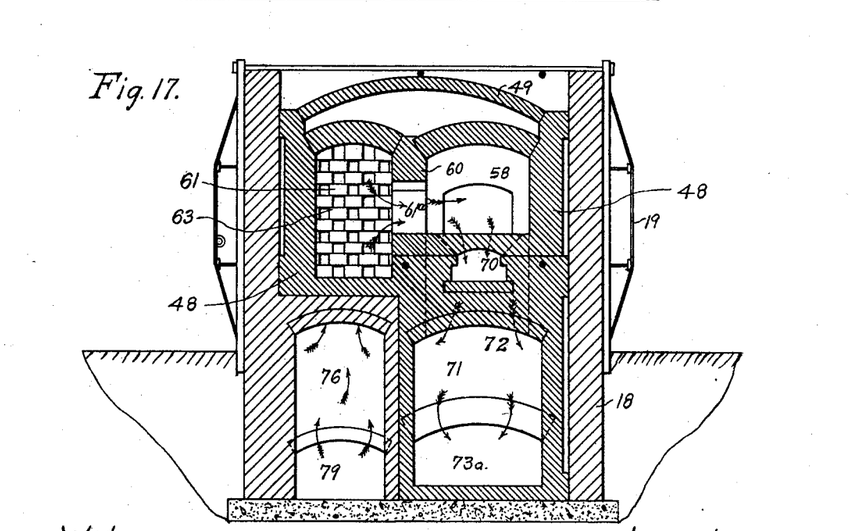
Fig. 17 is a similar view of the modified construction with the ash-pan omitted.

Preferably secured upon the inside of the frame 3 is a brace 5, attached at either end to the sides of the frame 3 and having secured upon either side thereof guides or ways 6, Figs. 1 and 10, said brace serving as a stop or rest for the bottom of the door 7, sliding in said ways.

The outside or mask door 7 preferably embodies a frame 8, Fig. 11, over which is secured a sheet of material 9, preferably brass, desirably surmounted by a lining 10, of asbestos or like substance, the same being retained in position by a retaining-frame 11, substantially as shown in said figure. The door 7 may be provided with a chain or cable 12, Fig. 4, carrying a counterweight 13 and passing over a sheave or roller 15 upon the wall 1 above the opening 2 and over a sheave or roller 16, carried by a standard or support 17 upon the rear of the furnace, and by means of this construction the view of the furnace proper can be quickly and easily cut off as soon as the remains shall have passed beyond the wall 1 during the introduction of the same into the furnace, and the heat is practically excluded from the anteroom or chapel by means of an air-space surrounding the furnace proper, through which a current of cool air is caused to pass and by reason of the construction of the mask-door.

The furnace proper preferably embodies an outer wall or structure 18, braced by buckstaves 19 and rods 20, while the front wall 21 and rear wall 22 are desirably provided with angle-irons 23, and the front wall 21 is preferably provided with an induction-opening 24, surrounded by a metallic frame 25, having guides or ways 26, constructed to receive a brick-lined sliding door 27, preferably provided with a peep-hole or slide 28, through which the process of cremation can be observed, and it will be understood that the opening 2 in the wall 1 and the opening 24 in the wall 21 will coincide or register, so that the remains can be readily introduced into the furnace proper.

Figure 2:
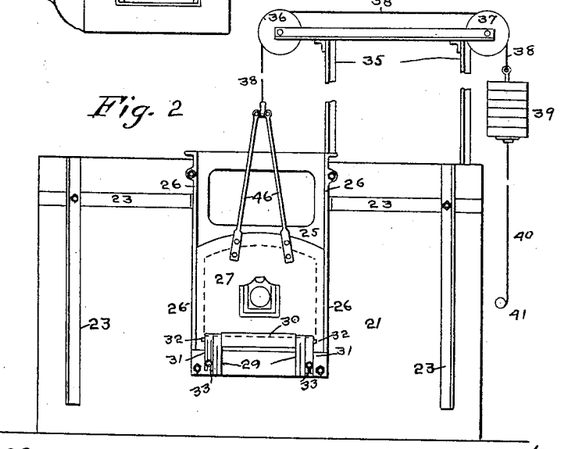
Fig. 2 is a front elevational view of the furnace with the partition-wall removed and with other parts omitted.

Mounted in standards or arms 29 upon the door-frame 25 is an antifriction device or roller 30, constructed to receive and facilitate the introduction of the casket or remains into the furnace, and depending closing and directing arms 31 are preferably mounted upon the ends of the roller-shaft 32 and are constructed with bifurcated ends to receive guide-pins 33, carrying springs 34 to force the ends of said arms against the door, Figs. 2 and 12.

Mounted upon the front wall 21 is a frame 35, supporting sheaves or rollers 36 and 37, over which passes a chain or cable 38, carrying a counterweight 39, having a chain or cable 40 connected therewith and passing over a winch 41, Figs. 1 and 2, operated by a shaft 42, mounted in a bearing 43 upon the wall 1 and in a bracket 44 upon the wall 18 and carrying a crank 45, by means of which the winch 41 is rotated to wind the chain or cable 40 thereon and raise the furnace-door 27, which may be connected with said chain or cable 38 by bars or rods 46, Figs. 1 and 2 of the drawings, and the winch-shaft 42 may be provided with a ratchet and pawl 47 to prevent the accidental reverse movement of the shaft.

Figure 3:
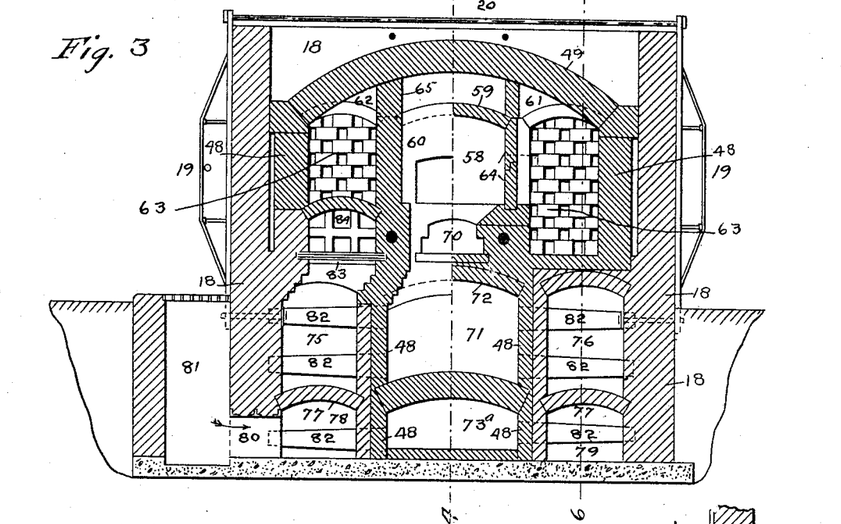
Fig. 3 is a view taken on line 3 3 of Fig. 1 with one of the burners and the ash-pan omitted.
Figure 4:
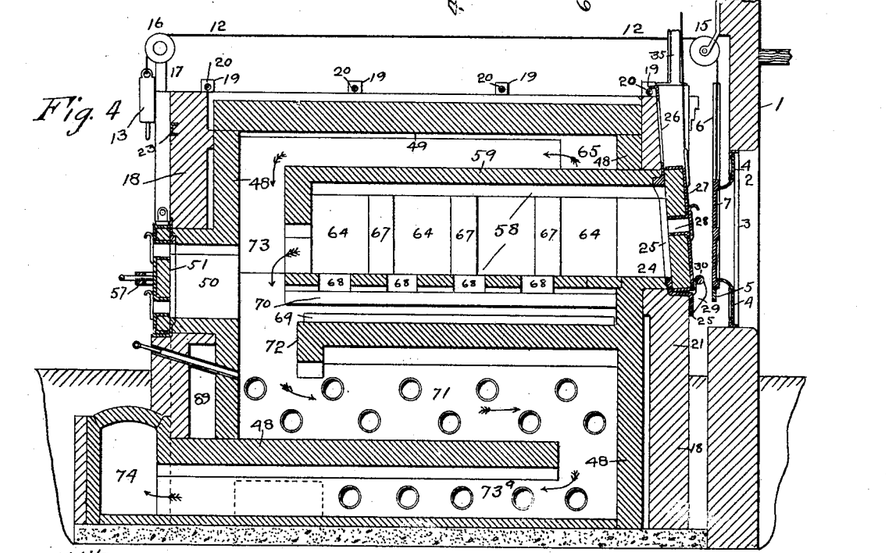
Fig. 4 is a longitudinal central section taken on line 4 4 of Fig. 3.
Figure 5:
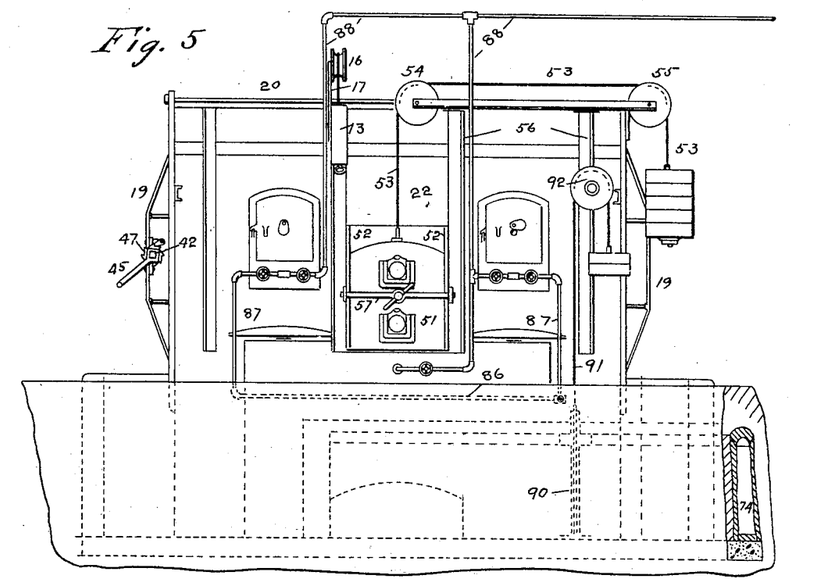
Fig. 5 is a rear elevational view of the furnace.
Figure 6:
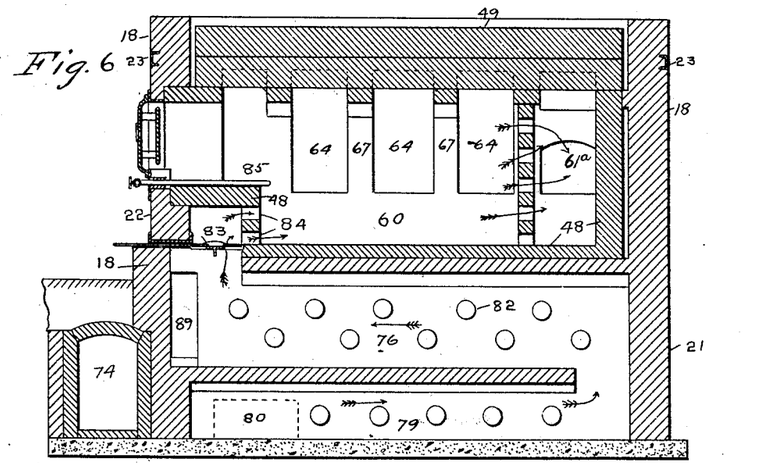
Fig. 6 is a longitudinal sectional view taken on line 6 6 of Fig. 3.

Within the outside wall 18, and preferably at a slight distance therefrom, so as to constitute a dead-air chamber therebetween, is a lining 48, of fire-brick or other refractory material, to withstand the intense heat to which the interior construction is subjected, preferably having an arched roof 49, Figs. 3, 4, and 6, and an extension 50 is preferably provided, passing through the rear wall and adapted to be closed by a brick-lined door 51, slidably mounted in ways or guides 52 and connected with a counterweighted chain or cable 53, passing over sheaves or rollers 54 and 55 upon a support or frame 56, secured upon the rear wall of the furnace, and a lock-bar 57 may be employed to secure the rear door 51 in a closed position, the same being only used to gain access to the incinerating and ash chambers, Figs. 1, 4, and 5 of the drawings.

The incinerating-chamber 58, Figs. 1, 3, 4, and 6, preferably occupies the central portion of the furnace, and access is afforded thereto by means of the front and rear doors 27 and 51 of the furnace, through the former whereof the remains are introduced into the incinerating-chamber, which is preferably constructed with an arched roof 59, that forms, with the furnace-roof 49 and the walls 60, a flue for the flame of the left-hand burner, said flame passing through the fire-chamber 62 against the break-wall 63, of checked brick, at the front end of the fire-chamber, where the flame is retarded and divided, and passes up through an opening in the wall 60 to said flue or passage again to the rear of the furnace after traversing and heating the roof of the incinerating-chamber.

The walls 60 between the incinerating-chamber 58 and the fire-chambers 61 and 62 are preferably constructed of tiles 64, of refractory material, Figs. 1 and 15, having a flange or rabbet 65ª, adapted to enter recesses or grooves 66 in blocks 67, whereby a thin wall of great strength and rigidity is produced and one capable of enduring a great amount of heat without injury.

The floor or bottom of the incinerating-chamber 58 is desirably provided with openings 68, Figs. 1 and 4, to permit the ashes from the consumed remains to fall therethrough into a pan or receptacle 69 in the ash-chamber 70, desirably located directly below the incinerating-chamber. However, the ash-pan may be dispensed with, and the ashes may fall directly into the ash-chamber and be removed therefrom by means of a suitable brush.

Preferably arranged directly beneath the ash-chamber 70 is a combustion-chamber 71, preferably separated therefrom by a wall or partition 72, Fig. 4, forming the bottom or floor of the chamber and extending as far back as the end of the incinerating-chamber 58, so as to leave a vertical flue or passage 73, through which the flame or heated medium passes into the upper combustion-chamber 71, after having traversed the roof or ceiling of the incinerating-chamber, as before described, and after passing through the upper combustion-chamber the heated medium passes into and through the lower combustion-chamber 73$^a$, into a flue 74, to the stack or chimney. Thus the flame or heated medium passes from the left-hand burner at the rear of the fire-chamber 62 therethrough to the front of the furnace, thence through an opening 65, Fig. 4, in the wall 60 into the flue above the incinerating-chamber, passing over and heating the roof or ceiling thereof, again to the rear of the furnace, thence downwardly passing the rear end of the incinerating-chamber 58, through the flue 73, into the upper combustion-chamber 71, along that and the lower combustion-chamber to the flue 74, and to the chimney.

The construction of the furnace is preferably such that all of the gases produced in the fire and incinerating chambers pass to the combustion-chambers, where they are entirely consumed.

Beneath the fire-chambers 61 and 62 and on each side of the combustion-chambers 71 and 73$^a$ are large warming-chambers or air-ducts 75 and 76, separated by arches 77 from the lower air-ducts 78 or 79, the latter whereof desirably communicate at 80 with fresh-air passages or conduits 81, Figs. 1 and 3, so that the fresh air passes in through the passages 81, preferably on each side of the rear of the furnace, thence successively along the air-ducts 79 and 76 upon the right side of the furnace, wherein are transversely disposed radiator-tubes 82, having the large open ends thereof exposed to the flame and heat of the combustion-chambers 71 and 73$^a$ and which tubes warm the incoming fresh air, thus rendering the furnace largely regenerative and attaining economy of fuel by returning to the fire-chambers a portion of the waste heat, which would otherwise escape up the chimney. Also a better combustion of fuel results from this heated draft than would be the case with a cold draft.

From the upper warming-chamber or air-duct 76 the warmed fresh air passes upwardly through the damper 83, Figs. 6 and 14, and the apertured partition 84 into the rear end of the fire-chamber 61, and just below the burner 85, Fig. 6, having suitable supply connections 87, Fig. 5, and preferably provided with steam or compressed-air supply connections 88 to spray or atomize the heating agent employed if the latter consists of crude or distilled oil; but it will be understood that the burners may be of any desired number and type, and any kind of fuel may be used. Also suitable cocks, valves, or other necessary devices may be employed to regulate the respective quantity of oil and steam or air.

A transverse flue 89, Figs. 4 and 6, is preferably located across the rear end of the furnace proper, terminating beneath the burners, so that the fresh air entering through the passages 81 of the furnace after traversing and being heated in the air-ducts or warming-chambers 75 and 78 on said side is conveyed or conducted across the end of the furnace in sufficient quantity to equalize the combustion or demand upon each side of the furnace, a damper 83 being located upon each side of the furnace.

The chimney-draft is preferably regulated by means of a damper or other device 90, Figs. 1 and 5, desirably having a counterweighted chain or cable 91 passing over a sheave or roller 92, Fig. 5.

It will be understood that all parts of the furnace exposed to the action of the heat are constructed of fire-brick or other refractory material, and the other parts may be built of ordinary brick and may be braced by buckstaves or rods.

By constructing the bottom or floor of the incinerating-chamber 58 with openings 68 having inclined walls the ashes from the burned bodies will be directed into the ash-pan 69, beneath which said walls preferably overhang, Fig. 15; but these openings also cause a downdraft of the flame or heated medium around the body being cremated and out through the ash-chamber, thereby greatly aiding the consumption thereof.

The operation of this invention will be readily understood from the foregoing description when taken in connection with the accompanying drawings and the following explanation thereof.

To prepare for a cremation, the furnace must first be brought to a glowing-red heat, and for this purpose the burners in the fire-chambers 61 and 62 are lighted. The heat from the burner passes through the latter chamber to and against the break-wall 63, at the front end thereof, where the flame or heated medium is retarded and caused to pass through the checker-brick thereof and out through the opening in the wall 60, up into the flue above the incinerating-chamber 58, thence again to the rear of the furnace, where the flame or heated medium is directed downwardly into the vertical flue 73 at the end of the incinerating-chamber 58, Fig. 4, and into and through the upper combustion-chamber 71, thereby heating the radiator-tubes therein, again to the front of the furnace, where it descends into and traverses the lower combustion-chamber 73ª until it a second time returns to the rear end of the furnace and passes into the flue 74 and thence into the stack or chimney.

The flame or heated medium from the burner traverses the fire-chamber 61 to and against the break-wall 63, at the front end thereof, through said wall and through an opening 61ª in the wall 60, into the incinerating-chamber 58, therethrough to the rear of the furnace, into the vertical flue 73, through the combustion-chambers 71 and 73ª successively, to the flue 74, to the stack or chimney.

The fresh air enters through the passage 81 at each side of the furnace, passes into the rear end of the lower warming-chambers 78 and 79, through the latter to the front of the furnace, and up into and through the upper warming-chambers 75 and 76 and back to the starting position. Thence the air heated by its passage just described and by contact with the radiator-tubes 82 in said warming-chambers passes up through the dampers 83 and the apertured partitions 84, Fig. 6, into the fire-chambers just below the burners.

The transverse duct 89, extending across the rear end of the furnace from one upper combustion-chamber to the other, tends to equalize the amount of heated air furnished to the burners.

When the furnace has attained the required temperature, the fires or burners are extinguished in both chambers, and upon a given signal the attendant raises the heavy front furnace-door 27 by means of the crank 45 and winch 41 and also the mask-door, whereupon the body, preferably within the casket, is pushed into the incinerating-chamber 58 over the roller 30, when upon another signal the attendant rapidly closes the mask-door and then the furnace-door 27, whereupon all view of the furnace is cut off.

The whole operation is performed so quickly and orderly that only a few moments elapse during which the interior of the furnace is exposed to view and the furnace is closed before the casket begins to burn.

A fierce combustion of the casket and body ensues, which continues for some time. When that begins to subside, the burner in the fire-chamber 62 may be started again and the heat of the furnace maintained until the process of cremation is completed without bringing the body into contact with the flame from the burners.

If for any reason it is desired to still further expedite the process, the burner in the fire-chamber 61 may also be started, and the heat from that being brought directly upon the body rapidly consumes what portion still remains. As the body is consumed the ashes fall through the openings into the ash-chamber, or, if a pan has previously been placed in position, into the pan, which may afterward be withdrawn with the ashes.

One effect of the openings in the floor of the incinerating-chamber is that the downward-acting draft of the furnace draws the flames produced in the chamber down through said openings and through the ash-chamber, as through a flue, thereby assisting the incineration by bringing the fire into closer contact around and under the body.

Figure 7:
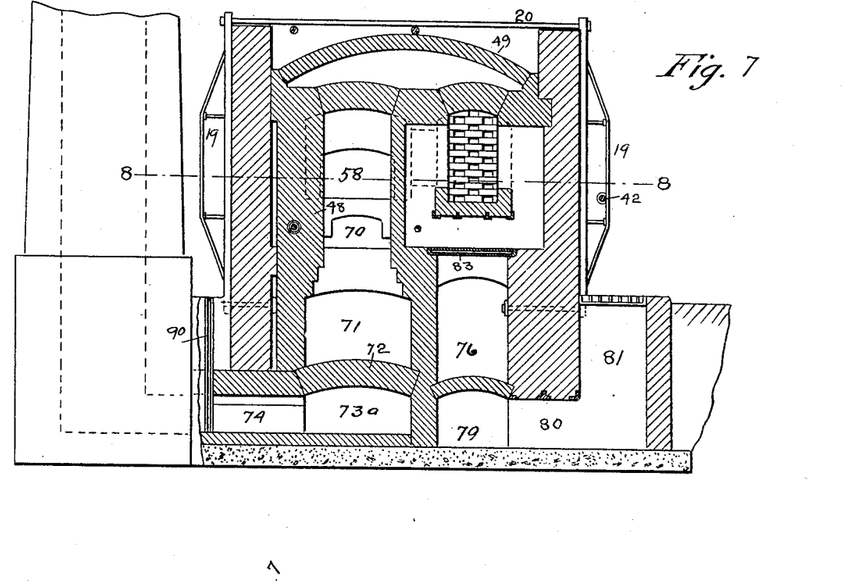
Fig. 7 is a sectional view of a modified construction, taken on line 7 7 of Fig. 8.
Figure 8:
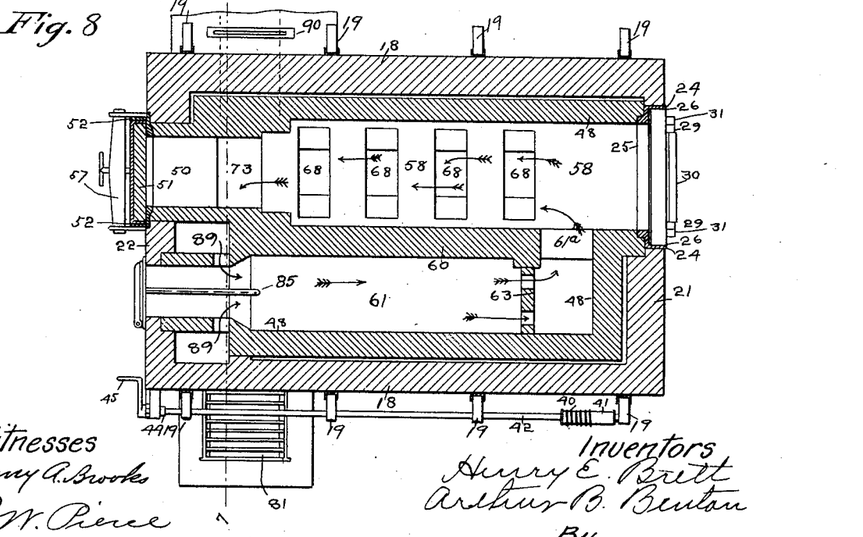
Fig. 8 is a horizontal sectional view taken on line 8 8 of Fig. 7.

Referring now to Figs. 7 and 8 of the drawings, there is illustrated a modified form of the construction hereinbefore described and shown wherein one fire-chamber, together with the flue over the incinerating-chamber, is omitted, the heat from the one fire-chamber passing directly into and through the incinerating-chamber; but in other respects the construction and operation is substantially similar to that described in relation to the other figures of the drawings.

In the modification the air preferably enters through the flue or passage 81 into the rear end of the lower warming-chamber 79, through that chamber to the front of the furnace, into the upper chamber 76, and back to the rear of the furnace, thence up through the damper 83, through the vertical ducts, into the fire-chamber 61, along the same to and through the break-wall 63, thence through an opening in the wall 60 into the front end of the incinerating-chamber 58, through the same back to the rear of the furnace, thence down through the vertical flue 73, into and through the upper and lower combustion-chambers 71 and 73ª, respectively, via the flue 74 to the stack or chimney, as will be readily understood.

It is not desired to confine this invention to the specific construction, combination, and arrangement of parts herein shown and described, and the right is reserved to make all such changes in and modifications of the same as come within the spirit and scope of the invention.

We claim—

1. A furnace provided with an incinerating-chamber, having an apertured bottom or floor and means constructed to cause the consuming medium to pass along the outside of said chamber and return over and down through said apertures opposite the initial direction thereof.

2. A furnace provided with an incinerating-chamber having an apertured bottom or floor and an inlet, an ash-chamber below said incinerating-chamber and means for directing the flame or consuming medium through said inlet into said incinerating-chamber and causing a portion of the same to traverse the latter and a portion to pass down through said apertures and then traverse said ash-chamber in the same direction as in the incinerating-chamber to quickly and completely consume the body.

3. A furnace provided with an incinerating-chamber, a fire-chamber alongside thereof and means constructed to cause a consuming medium from the fire-chamber to traverse the roof or ceiling of the incinerating-chamber to heat the same and to pass downwardly across the end thereof.

4. A furnace provided with an incinerating-chamber, a fire-chamber alongside thereof, a flue above said incinerating-chamber and means to cause the consuming medium to traverse the fire-chamber, enter and pass through said flue and finally pass downwardly across the end of said incinerating-chamber.

5. A furnace provided with a fire-chamber having a brake-wall, an incinerating-chamber adjacent to the fire-chamber, a flue chamber or passage above the incinerating-chamber and means to cause the consuming medium to traverse the fire-chamber and pass through said wall into said flue and return above and heat said incinerating-chamber.

6. A furnace provided with an incinerating-chamber, a lateral fire-chamber in connection with one end thereof, a combustion-chamber below the incinerating-chamber, and means for causing the consuming medium to traverse the fire-chamber and pass into the incinerating-chamber and return in a reverse direction therethrough and be directed downwardly at the end thereof into and through the combustion-chamber.

7. A furnace provided with an incinerating-chamber, a lateral fire-chamber in communication therewith, a brake-wall in the fire-chamber and means for impelling a consuming medium against said wall and through said communication into the incinerating-chamber, said incinerating-chamber being so constructed as to return the consuming medium in a reverse direction therethrough and to cause the same to pass downwardly at the end thereof.

8. A furnace provided with an incinerating-chamber, a fire-chamber alongside thereof, provided with an outlet above the incinerating-chamber, so that the heating medium is caused to pass over, and heat the same, and another fire-chamber having an outlet opening into the incinerating-chamber, said incinerating-chamber being adapted to receive and discharge the products from said fire-chamber.

9. A furnace provided with an incinerating-chamber, a fire-chamber alongside thereof provided with an outlet above the incinerating-chamber, whereby the heating medium is caused to pass over and heat the same and another fire-chamber having an opening into the incinerating-chamber, whereby said medium is caused to pass into and through the latter and a combustion-chamber constructed to receive the aforesaid currents of said medium which pass thereinto from and across the end of said incinerating-chamber.

10. A furnace provided with an incinerating-chamber, fire-chambers, one whereof is provided with an outlet above the incinerating-chamber, whereby the heating medium is caused to pass over and heat the same and the other fire-chamber having an outlet opening into the incinerating-chamber, said incinerating-chamber being adapted to receive and discharge the products from said fire-chamber, and an upper and a lower combustion-chamber constructed to receive the aforesaid currents of said medium which pass thereinto from and across the end of said incinerating-chamber.

11. A furnace provided with upper and lower combustion-chambers constructed to receive and pass to the chimney the currents of the consuming medium, upper and lower warming-chambers and radiator-tubes constructed and arranged to receive heat from the combustion-chambers, whereby the incoming air for supporting combustion is conveyed through said warming-chambers successively and heated from said tubes.

12. A furnace provided with an upper and lower combustion-chamber wherethrough the heating medium is caused to pass successively to the chimney, adjoining upper and lower warming-chambers, tubes having the large open ends thereof opening into the combustion-chambers and extending across the warming-chambers and means for conducting air into the lower warming-chamber and causing the same to pass therethrough and return through the upper warming-chamber so as to be heated by such passage in contact with said tubes to facilitate combustion.

13. A furnace provided with an ignition device, a lower warming-chamber receiving the fresh air and a superimposed warming-chamber directly above, receiving the partially-heated air from the first-mentioned chamber and further heating the same and delivering the heated air to said device.

14. A furnace provided with an ignition device, a fire-chamber receiving direct heat therefrom, upper and lower combustion-chambers receiving waste heat, upper and lower warming-chambers receiving heat from said fire and combustion chambers and constructed to heat the incoming air and deliver the same to said device.

15. A furnace provided with an incinerating-chamber, fire-chambers on each side thereof, combustion-chambers below the incinerating-chambers and warming-chambers below the fire-chambers and on each side of the combustion-chambers, whereby the consuming medium is caused to traverse one of the fire-chambers and return above the incinerating-chamber and pass down into the combustion-chambers and the medium passes through the other fire-chamber and into and through the incinerating-chamber and thence to the combustion-chamber with the first-mentioned current of said medium and heats the incoming air that traverses said warming-chamber.

In testimony whereof we have signed our names to this specification in the presence of two subscribing witnesses.

HENRY E. BRETT.
    ARTHUR B. BENTON.

Witnesses:
 AMELIA GUEST,
 L. B. ALDERETE.